US010025938B2

(12) United States Patent
Krishnamurthi

(10) Patent No.: US 10,025,938 B2
(45) Date of Patent: Jul. 17, 2018

(54) USER-CONTROLLABLE SCREEN PRIVACY SOFTWARE

(71) Applicant: QUALCOMM Incorporated, San Diego, CA (US)

(72) Inventor: Govindarajan Krishnamurthi, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 15/059,230

(22) Filed: Mar. 2, 2016

(65) Prior Publication Data

US 2017/0255786 A1     Sep. 7, 2017

(51) Int. Cl.
| H04L 29/06 | (2006.01) |
| G06F 21/60 | (2013.01) |
| G06F 3/01 | (2006.01) |
| G06F 3/16 | (2006.01) |

(52) U.S. Cl.
CPC ............ *G06F 21/604* (2013.01); *G06F 3/013* (2013.01); *G06F 3/017* (2013.01); *G06F 3/167* (2013.01); *H04L 63/20* (2013.01)

(58) Field of Classification Search
CPC ........ G06F 21/604; G06F 3/013; G06F 3/017; G06F 3/167; H04L 63/20
USPC ........................................................ 726/28
See application file for complete search history.

(56) References Cited

U.S. PATENT DOCUMENTS

| 7,779,475 B2 | 8/2010 | Jakobson et al. |
| 8,973,149 B2 | 3/2015 | Buck |
| 2010/0124363 A1 | 5/2010 | Ek et al. |
| 2010/0205667 A1* | 8/2010 | Anderson ............... G06F 3/013 726/19 |
| 2011/0321143 A1 | 12/2011 | Angaluri et al. |
| 2012/0131471 A1* | 5/2012 | Terlouw .............. G06F 3/04883 715/741 |
| 2013/0321452 A1 | 12/2013 | Kawalkar et al. |
| 2014/0082745 A1* | 3/2014 | Guedalia ............... G06F 3/0481 726/27 |
| 2014/0176562 A1 | 6/2014 | Somerfield |

OTHER PUBLICATIONS

International Search Report and Written Opinion—PCT/US2016/068736—ISA/EPO—dated Mar. 9, 2017.

\* cited by examiner

*Primary Examiner* — Michael S McNally
(74) *Attorney, Agent, or Firm* — MG-IP Law, P.C.

(57) ABSTRACT

The disclosure relates to software that provides fine-grained user control over when and how a software-based privacy filter is used to reduce clarity and/or visibility associated with content rendered on a display screen. For example, according to various aspects, the software may have access to the display screen and various other components that can be used to detect and/or track a current context associated with information displayed on the screen. As such, based on the current context, the software may determine an area displayed on a screen having current interest to one or more authorized users and activate a software-based privacy filter configured to reduce the clarity and/or visibility associated with information displayed on the screen outside the area having the current interest to the one or more authorized users as needed (e.g., based on a sensitivity level associated with the displayed information, sensor-based inputs indicating a sensitive context, etc.).

30 Claims, 9 Drawing Sheets

USER-CONTROLLABLE SCREEN PRIVACY SOFTWARE

TECHNICAL FIELD

The various aspects and embodiments described herein generally relate to rendering content on a display screen, and more particularly, to screen privacy software that provides fine-grained user control over when and how a privacy filter is used to reduce visibility associated with the content rendered on the display screen.

BACKGROUND

As mobile devices, smartphones and tablets, become ubiquitous, people have started to utilize devices to view private, confidential, or otherwise sensitive information. In various use cases, the private, confidential, or otherwise sensitive information could deal with work-related information, email, health information, financial information, or any other information that the user may consider sensitive. As such, in various contexts, the user may wish that such sensitive information not be visible to passers-by, curious onlookers, intentional snoopers, and/or other people who might be in the vicinity when the sensitive information is displayed on the screen. One way to prevent other users from seeing information displayed on the screen would be to purchase a physical filter that can be placed on the screen such that the displayed information is only visible to those directly in front of the display and occluded, obscured, or otherwise not visible to others (e.g., a person sitting at an angle). However, such a physical filter could be expensive, reduce screen visibility from the perspective of the intended user, and otherwise be cumbersome to employ.

Another potential approach to protect unauthorized users from viewing sensitive information displayed on the screen could be to provide an application with sufficient intelligence to determine the sensitivity associated with the information to be displayed and to take appropriate steps to display that information in a protected manner. In other words, the application can leverage capabilities associated with a display such that the display or certain sections within the display can be dimmed, polarized, or otherwise altered to restrict viewing using software-controlled mechanisms. However, these techniques generally apply to a device with content-aware and display-aware applications, which may be restrictive in the sense that the application may not be able to decipher the sensitivity associated with all data that may be displayed. Moreover, these software-controlled mechanisms do not allow a user to provide an input to control the context and the manner in which to restrict viewing.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

According to various aspects, user-controllable screen privacy software is described herein to allow a user to fine tune or otherwise customize the manner in which data is visibly presented on a screen (e.g., when and/or how a privacy filter is used to reduce visibility associated with content rendered on the display screen). According to various aspects, the user-controllable screen privacy software may have access to the screen as well as touchscreen sensors, a camera, a microphone, one or more location sensors, one or more biometric sensors, and/or other suitable data sources that may be used to indicate a current context associated with information displayed on the screen. The screen privacy software may run in the background, be automatically started when needed, manually activated by the user, and/or any suitable combination thereof. In other examples, sensors such as the touchscreen sensors, the camera, the microphone, the location sensors, the biometric sensors, etc. may detect certain contexts in which the privacy filter could be necessary and suggest that the user activate the privacy filter accordingly (e.g., in response to detecting multiple faces in a camera input, different voices in a microphone input, etc.). As such, the user-controllable screen privacy software described herein can then be activated in response to the user confirming the need to implement the privacy filter, or the screen privacy software may be configured to automatically activate based on a context indicating a privacy need without waiting on the user to provide explicit consent. Furthermore, in various embodiments, the user may turn off or otherwise deactivate the privacy filter, in-whole or in-part, at any suitable time. For example, the user could start to browse a particular page, document, etc. with the privacy filter activated and the privacy filter may later be deactivated once the user reaches another portion in the page, document, etc. (or vice versa).

According to various aspects, once the screen privacy software has been suitably activated, the user may choose to designate a certain "area of interest" on the screen where data is to be clearly visible while any areas positioned outside the designated area of interest may be blurred, polarized, dimmed, or otherwise altered to prevent visibility according to any suitable technique(s). The user may designate and/or modify the area of interest at any time according to a certain shape, which may be defined via touchscreen inputs, touchless gestures, gaze tracking, voice input, and/or other suitable user and/or sensor input. In various embodiments, the user may further tune the dimensions and/or appearance associated with the area of interest (e.g., one user may prefer to define the area of interest according to a rectangular shape while other users may prefer a circle, a random non-regular shape, etc.). Furthermore, as the user reads data on the screen, the area of interest may be moved or otherwise repositioned to the current area that the user is viewing based on a touch gesture, a touchless gesture, one or more sensor-based inputs, and/or any suitable combination thereof. For example, in various embodiments, the screen privacy software may track user eye movements to determine the gaze of the user and move the area of interest in which data is to be visible automatically based on shifts in the user gaze. Furthermore, according to various aspects, the features that allow the screen privacy software to detect a context in which the privacy filter could be necessary according to sensor-based inputs can also be used to create a privacy filter that defines the area of interest based on the sensor-based inputs. For example, in a presentation context where there may be multiple authorized users, face recognition and/or other biometrics can be used to determine which user to track such that the area of interest can be moved or otherwise repositioned based on the tracked user. In a similar sense, the user(s) can manually define which user or users to track when moving the area of interest, and the privacy filter can be placed, adjusted, or otherwise tuned to ensure that authorized users can view the information displayed within the area of interest while the information displayed within the area of interest is not visible to any unauthorized users located in sufficient proximity to see the screen.

According to various aspects, a method for providing user-controllable screen privacy may therefore comprise determining, via software executing on a user device, an area displayed on a screen having current interest to one or more authorized users and activating a software-based privacy filter configured to reduce visibility associated with information displayed on the screen outside the area having the current interest to the one or more authorized users. Furthermore, in various embodiments, the method may additionally comprise receiving a user input that indicates the area having the current interest to the one or more authorized users, wherein the user input that indicates the area having the current interest to the one or more authorized users comprises one or more of a touch gesture or a touchless gesture. Alternatively (or additionally), the software may receive information from one or more sensors on the user device that indicates the area having the current interest to the one or more authorized users, wherein the information received from the one or more sensors comprises one or more of biometric data, a current gaze detected using a camera positioned on a same side of the user device as the screen, a voice input received at a microphone on the user device, or location data detected using one or more location sensors on the user device.

According to various aspects, the method for providing user-controllable screen privacy may further comprise determining a sensitivity level and/or a potential need to activate the software-based privacy filter according to information received from the one or more sensors on the user device. In various embodiments, the method may additionally comprise detecting, at the user device, a change in the area displayed on the screen having the current interest to the authorized users and adjusting the software-based privacy filter to reduce visibility associated with information displayed on the screen outside the changed area having the current interest to the authorized users. Furthermore, in various embodiments, the sensor-based inputs may be used to determine the authorized users among one or more people located in sufficient proximity to view the screen, which may be used to track the authorized users and thereby detect the change in the area displayed on the screen having the current interest to the authorized users and/or to determine one or more unauthorized users in sufficient proximity to view the screen. In the former case, the software-based privacy filter may be adjusted to reduce visibility associated with information displayed on the screen outside the changed area having the current interest to the authorized users, while in the latter case, the software-based privacy filter may be adjusted such that information displayed on the screen within the area having the current interest to the authorized users is visible to the authorized users and not visible to the unauthorized users.

According to various aspects, an apparatus may comprise a screen and one or more processors configured to execute software configured to cause the one or more processors to determine an area displayed on the screen having current interest to one or more authorized users and activate a software-based privacy filter configured to reduce visibility associated with information displayed on the screen outside the area having the current interest to the one or more authorized users. In various embodiments, the apparatus may further comprise one or more input devices configured to receive a user input indicating the area having the current interest to the one or more authorized users according to one or more of a touch gesture or a touchless gesture and/or one or more sensors configured to provide, to the software, one or more sensor-based inputs indicating the area having the current interest to the one or more authorized users. In various embodiments, the software executed on the one or more processors may further cause the one or more processors to use the information received via the one or more input devices and/or the one or more sensors to adjust the software-based privacy filter, track the one or more authorized users (including the current area having interest to the one or more authorized users), detect one or more unauthorized users, and/or otherwise perform the functionality described in further detail herein.

According to various aspects, an apparatus may comprise means for displaying information and means for activating a software-based privacy filter configured to reduce visibility associated with the information displayed outside an area having current interest to one or more authorized users. In various embodiments, the apparatus may further comprise means for receiving one or more user inputs and means for sensing information that can be used to adjust the software-based privacy filter, track the one or more authorized users (including the current area having interest to the one or more authorized users), detect one or more unauthorized users, and/or otherwise perform the functionality described in further detail herein.

According to various aspects, a computer-readable storage medium may store computer-executable instructions configured to cause one or more processors to determine an area displayed on a screen having current interest to one or more authorized users and activate a software-based privacy filter to reduce visibility associated with information displayed on the screen outside the area having the current interest to the one or more authorized users. The computer-executable instructions may further cause the one or more processors to receive one or more user inputs and/or one or more sensor-based inputs that can be used to adjust the software-based privacy filter, track the one or more authorized users (including the current area having interest to the one or more authorized users), detect one or more unauthorized users, and/or otherwise perform the functionality described in further detail herein.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
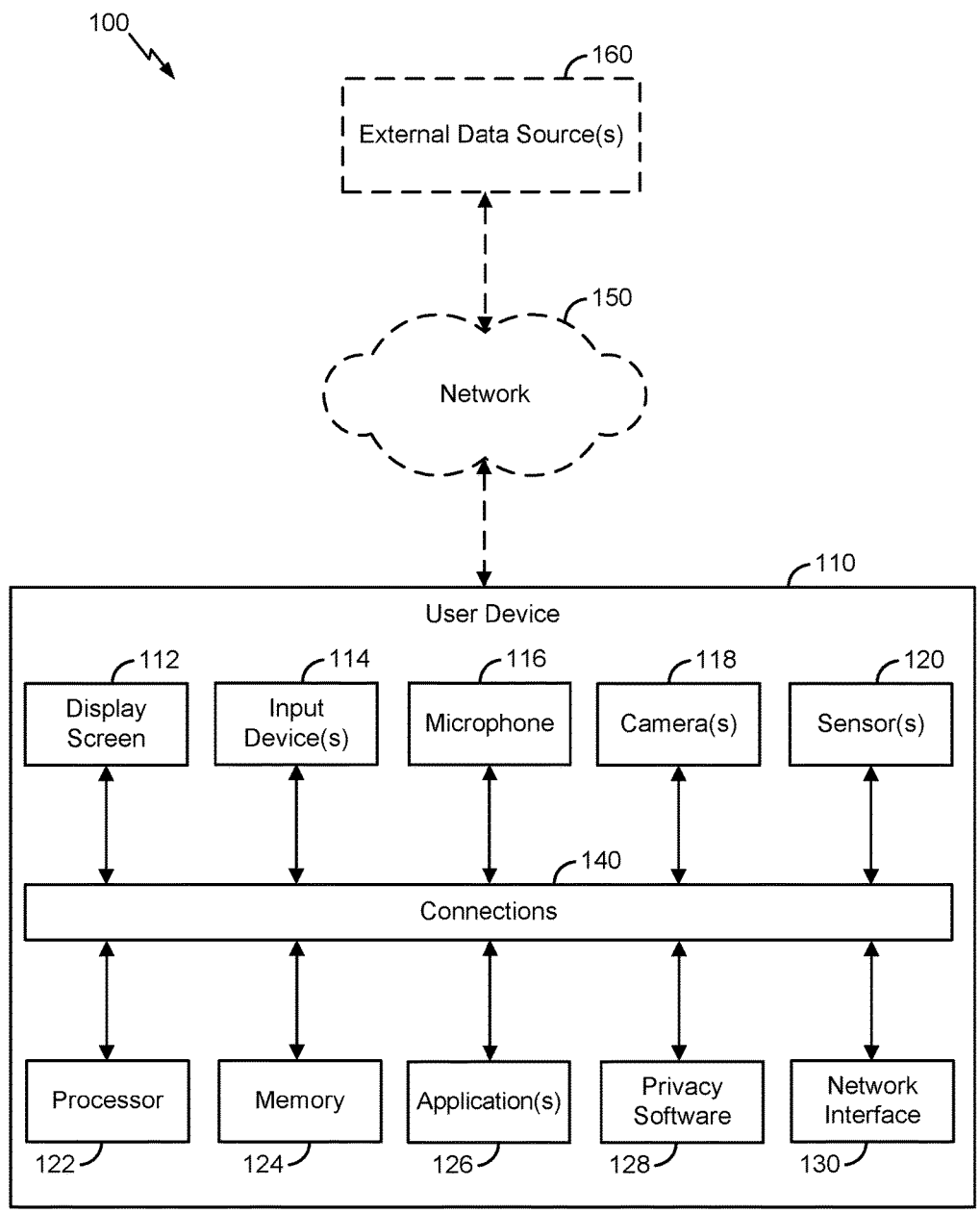
FIG. 1 illustrates an exemplary environment in which a user device can be configured with user-controllable screen privacy software, according to various aspects.

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user device," "user equipment" (or "UE"), "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can communicate with a radio access network (RAN) that implements a particular radio access technology (RAT), over a wired network, over a Wi-Fi network (e.g., based on IEEE 802.11, etc.), and/or with other devices via a direct device-to-device (D2D) or peer-to-peer (P2P) connection.

As used herein, the terms "user device," "user equipment" (or "UE"), "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may be used herein to interchangeably refer to any suitable mobile or stationary device associated with a user, including any suitable user device that can communicate over a wired network, with a radio access network (RAN) using a particular radio access technology (RAT), over a Wi-Fi network (e.g., based on IEEE 802.11, etc.), and/or with other devices over direct device-to-device (D2D) or peer-to-peer (P2P) connections. However, those skilled in the art will appreciate the various aspects and embodiments described herein further contemplate that certain user devices may not have network communication capabilities.

According to various aspects, FIG. 1 illustrates an exemplary environment 100 in which a user device 110 can be configured with user-controllable screen privacy software 128 that may allow a user to fine tune or otherwise customize the manner in which data is visibly presented on a display screen 112. For example, as will be described in further detail herein, the user-controllable screen privacy software 128 may allow the user to control, among other things, when and/or how a privacy filter is used to reduce visibility associated with content rendered on the display screen 112. In various embodiments, the user-controllable screen privacy software 128 may have access to the display screen 112 as well as one or more input devices 114 (e.g., a keyboard, mouse, trackpad, touchscreen sensors integrated into the display screen 112, etc.). In addition, the user-controllable screen privacy software 128 may have access to a microphone 116, one or more cameras 118, and one or more sensors 120 that sense information that can be used to indicate a current context associated with information displayed on the display screen 112 (e.g., one or more location sensors, one or more biometric sensors, etc.). In various embodiments, the user device 110 may comprise a processor 122 and a memory 124 configured to store computer-executable instructions and/or other data to execute one or more applications 126 that may cause content or other information to be rendered on the display screen 112 as well as the user-controllable screen privacy software 128 that can be used to apply a privacy filter to the information rendered on the display screen 112.

Furthermore, in various embodiments, the user device 110 may include a network interface 130, which may comprise a wired network interface and/or a wireless transceiver having a transmitter configured to transmit one or more signals over one or more wireless communication networks and a receiver configured to receive one or more signals transmitted over the one or more wireless communication networks. In embodiments where the network interface 130 comprises a wireless transceiver, the wireless transceiver may permit communication with wireless networks based on various technologies such as, but not limited to, femtocells, Wi-Fi networks or Wireless Local Area Networks (WLANs) based on the IEEE 802.11 family of standards, Wireless Personal Area Networks (WPANS) such as Bluetooth, Near Field Communication (NFC), networks based on IEEE 802.15x standards, etc., and/or Wireless Wide Area Networks (WWANs) such as LTE, WiMAX, etc. The user device 110 may also include one or more ports (not shown) to communicate over wired networks. The various components associated with the user device 110 may be operatively coupled to each other and to other functional units (not shown) through one or more connections 140 (e.g., one or more buses, lines, fibers, links, etc.).

According to various aspects, the user device 110 can be configured to run the user-controllable screen privacy software 128 on the processor 122 in the background, where the user-controllable screen privacy software 128 may be automatically started when needed, activated in response to a manual input from the user, and/or any suitable combination thereof. In other examples, as noted above, the sensors 120 associated with the user device 110 may comprise touchscreen sensors integrated into the display screen 112, biometric sensors, one or more location sensors that can detect a current position associated with the user device 110 (e.g., using positioning signals that the network interface 130 receives from one or more external data sources 160 via a network 150). As such, information obtained from the input device(s) 114, the microphone 116, the camera(s) 118, the sensor(s) 120, the external data source(s) 160, etc. can be used to detect certain contexts in which the privacy filter could be necessary and suggest that the user activate the privacy filter accordingly.

For example, in various embodiments, the camera(s) 118 may include a screen-facing camera positioned on the same side of the user device 110 as the display screen 112 and detect a potential need to activate the privacy filter in response to determining that there are multiple faces visible on the same side of the user device 110 as the display screen 112. In another example, the microphone 116 may capture a voice input that includes multiple different voices such that a potential need to activate the privacy filter may be detected based on the fact that there may be unauthorized users within sufficient proximity to the display screen 112 to have their voices picked up at the microphone 116. In various embodiments, the user-controllable screen privacy software 128 can then be activated in response to the user confirming the need to implement the privacy filter, or the user-controllable screen privacy software 128 may be configured to automatically activate based on a context indicating a privacy need without waiting on the user to provide explicit consent. Furthermore, in various embodiments, the user may turn off or otherwise deactivate the privacy filter, in-whole or in-part, at any suitable time. For example, the user could start to browse a particular page, document, etc. with the privacy filter activated and the privacy filter may later be deactivated once the user reaches another portion in the page, document, etc. In a similar respect, the user could start to view information shown on the display screen 112 with the privacy filter deactivated and the privacy filter may later be activated in response to a manual user input, automatically based on context, or in other ways.

According to various aspects, once the user-controllable screen privacy software 128 has been suitably activated, the user may choose to designate a certain "area of interest" on the display screen 112 where data is to be clearly visible while a privacy filter may be applied to blur, polarize, dim, obscure, block, or otherwise alter information shown on the display screen 112 in one or more areas that are positioned outside the designated area of interest. As such, the privacy filter may be applied to reduce visibility in the areas positioned outside the designated area of interest and thereby prevent unauthorized users from viewing the information rendered on the display screen 112 in the areas outside the designated area of interest according to any suitable technique(s). Furthermore, in certain use cases, the privacy filter may optionally be applied to the information displayed in the areas outside the area of interest such that one or more authorized users can still see the information displayed therein and thereby only prevent the unauthorized users from having the ability to view the information displayed in the area(s) subject to the privacy filter.

According to various aspects, the user may designate and/or modify the area of interest at any time according to a certain shape, which may be defined via touchscreen inputs, touchless gestures, gaze tracking, voice input, and/or other suitable user and/or sensor-based input. In various embodiments, the user may further tune the dimensions and/or appearance associated with the area of interest (e.g., one user may prefer to define the area of interest according to a rectangular shape while other users may prefer a circle, a random non-regular shape, etc.). Furthermore, as the user reads data on the display screen 112, the area of interest may be moved or otherwise repositioned to the current area that the user is viewing based on a touch gesture, a touchless gesture, one or more sensor-based inputs, and/or any suitable combination thereof. For example, in various embodiments, the user-controllable screen privacy software 128 may track user eye movements to determine the gaze of the user and move the area of interest in which data is to be visible automatically based on shifts in the user gaze. Furthermore, according to various aspects, the features that allow the user-controllable screen privacy software 128 to detect a context in which the privacy filter could be necessary according to sensor-based inputs can also be used to create a privacy filter that defines the area of interest based on the sensor-based inputs. For example, in a presentation context where there may be multiple authorized users, face recognition and/or other biometrics can be used to determine which user to track such that the area of interest can be moved or otherwise repositioned based on the tracked user. Similarly, the user(s) can manually define which user or users to track when moving the area of interest, and the privacy filter can be placed, adjusted, or otherwise tuned to ensure that authorized users can view the information shown in the area of interest while the information displayed within the area of interest is not visible to any unauthorized users located in sufficient proximity to see the display screen 112.

Figure 2:
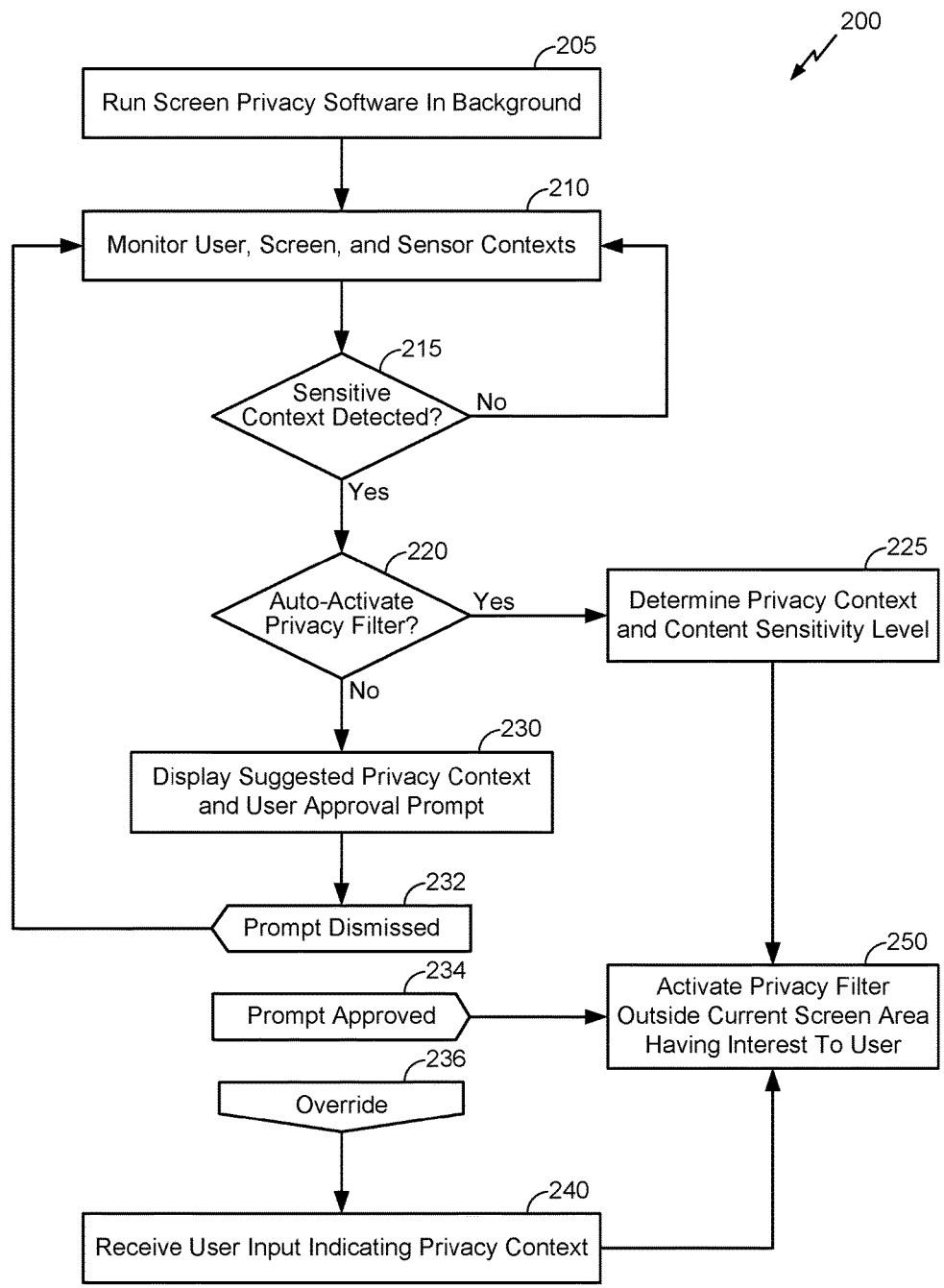
FIG. 2 illustrates an exemplary method to activate the user-controllable screen privacy software described herein, according to various aspects.

According to various aspects, FIG. 2 illustrates an exemplary method 200 to activate user-controllable screen privacy software as described herein (e.g., the user-controllable screen privacy software 128 described above in connection with FIG. 1). For example, in various embodiments, the method 200 shown in FIG. 2 may operate in the above-mentioned use case where the user-controllable screen privacy software runs on a user device in the background, at shown at block 205. As such, at block 210, the user-controllable screen privacy software may generally monitor a current context associated with information displayed on a screen associated with the user device, wherein the monitored context may include user, screen, and/or sensor-based contexts. For example, monitoring the user context at block 210 may comprise obtaining information from a screen-facing camera to determine one or more users that may be located in sufficient proximity to the user device to view the screen. As such, the screen privacy software may attempt to identify any people that may be visible within the current camera view (e.g., based on facial recognition) and determine a potential need to activate the privacy filter in response to detecting one or more people that are unknown or otherwise unauthorized. Furthermore, monitoring the screen context at block 210 may comprise determining whether any information displayed on the screen is considered private, confidential, or otherwise sensitive. For example, one or more applications that execute on the user device may be content-aware and/or display-aware such that the applications can indicate whether information that the applications are showing on the display is sensitive (e.g., in binary terms, according to a sensitivity level that can expressed in a range, based on the information originating from a sensitive source such as a financial institution or a government agency, etc.). Further still, monitoring the sensor context at block 210 may comprise analyzing audible inputs received at a microphone to detect potentially unauthorized users (e.g., in response to the audible inputs include more than one voice, one or more voices that cannot be matched to an existing voiceprint associated with an authorized user, etc.). The sensor context may also comprise location-based sensor input, wherein the potential need to activate the privacy filter may vary from one location to another (e.g., a user may be less concerned with screen privacy at home relative to public locations).

In various embodiments, at block 215, the monitored user, screen, and sensor contexts may be analyzed to determine whether a sensitive context has been detected. For example, a sensitive context may be detected in response to identifying one or more unauthorized users located in sufficient proximity to view the information displayed on the screen, in response to detecting that sensitive information is displayed on the screen, etc. In response to determining that the current context does not indicate a sensitive context, the user, screen, and sensor contexts may continue to be monitored at block 210. Otherwise, where the current context does indicate a sensitive context, the user-controllable screen privacy software may then determine whether an automatic activation setting has been applied at block 220. In response to determining that the automatic activation setting has been applied, the user-controllable screen privacy software may then determine the appropriate privacy context and content sensitivity level at block 225. For example, the privacy context may be determined based on a current area having interest to the user, which may be determined according to eye movements or gaze tracking to determine the area on the screen that the user is currently viewing. Alternatively, in various embodiments, the user may interact with the information displayed on the screen such that the user-controllable screen privacy software can infer the current area having interest to the user from the user interactions.

In various embodiments, the privacy filter may then be activated at block 250 such that any information displayed outside the current area having interest to the user is rendered with a reduced visibility. For example, areas on the screen located outside the current area having interest to the user may be polarized, dimmed, or otherwise obscured. Alternatively, information displayed in the areas on the screen located outside the current area having interest to the user may be rendered with a reduced font size, in a smaller window, on a dark background, or blocked from display altogether. As such, the privacy filter may utilize any suitable technique to reduce visibility in the areas outside the current area having interest to the user, and the various aspects and embodiments described herein are not limited to any particular one. Moreover, the privacy filter may optionally be adjusted depending on the content sensitivity level. For example, highly sensitive content may be blocked from display while less sensitive content may simply be dimmed. As such, the privacy filter may generally take the sensitivity level into consideration in determining the particular filtering techniques to be applied in the areas outside the current area having interest to the user.

In various embodiments, returning to block 220, the screen privacy software may display a suggested privacy context and user approval prompt at block 230 in the event that the automatic activation setting has not been configured. For example, the suggested privacy context may be determined in a similar manner as described above with respect to block 225, except that the user approval prompt displayed at block 230 may allow the user to dismiss the suggested privacy context, approve the suggested privacy context, and/or override the suggested privacy context. As such, in response to the user dismissing the suggested privacy context, as shown at block 232, the method 200 may return to block 210 and the user-controllable screen privacy software may continue to monitor the user, screen, and sensor contexts as described above without altering the information displayed on the screen. Alternatively, in response to the user approving the suggested privacy context, as shown at block 234, the privacy filter may be activated at block 250 in substantially the same manner as described above with respect to the auto-activation feature. In still another alternative, the user may override the suggested privacy context, as shown at block 236, in which case a user input indicating the appropriate privacy context may be received at block 240 such that the privacy filter may be activated at block 250 according to the received user input. For example, the user input could designate and/or modify the current area having interest to the user according to a shape defined via touch-screen inputs, touchless gestures, gaze tracking, voice input, and/or other suitable user input. Furthermore, the user may indicate that one or more users thought to be unauthorized are actually authorized and therefore authenticate such users to allow the other users to view the screen. In another example use case, the user may indicate the sensitivity level associated with any information displayed on the screen and/or the particular privacy filtering techniques to be applied thereto. As such, based on the user input to indicate the current privacy context, the privacy filter may then be activated accordingly at block 250 to the areas outside the current area of interest.

Figure 3:
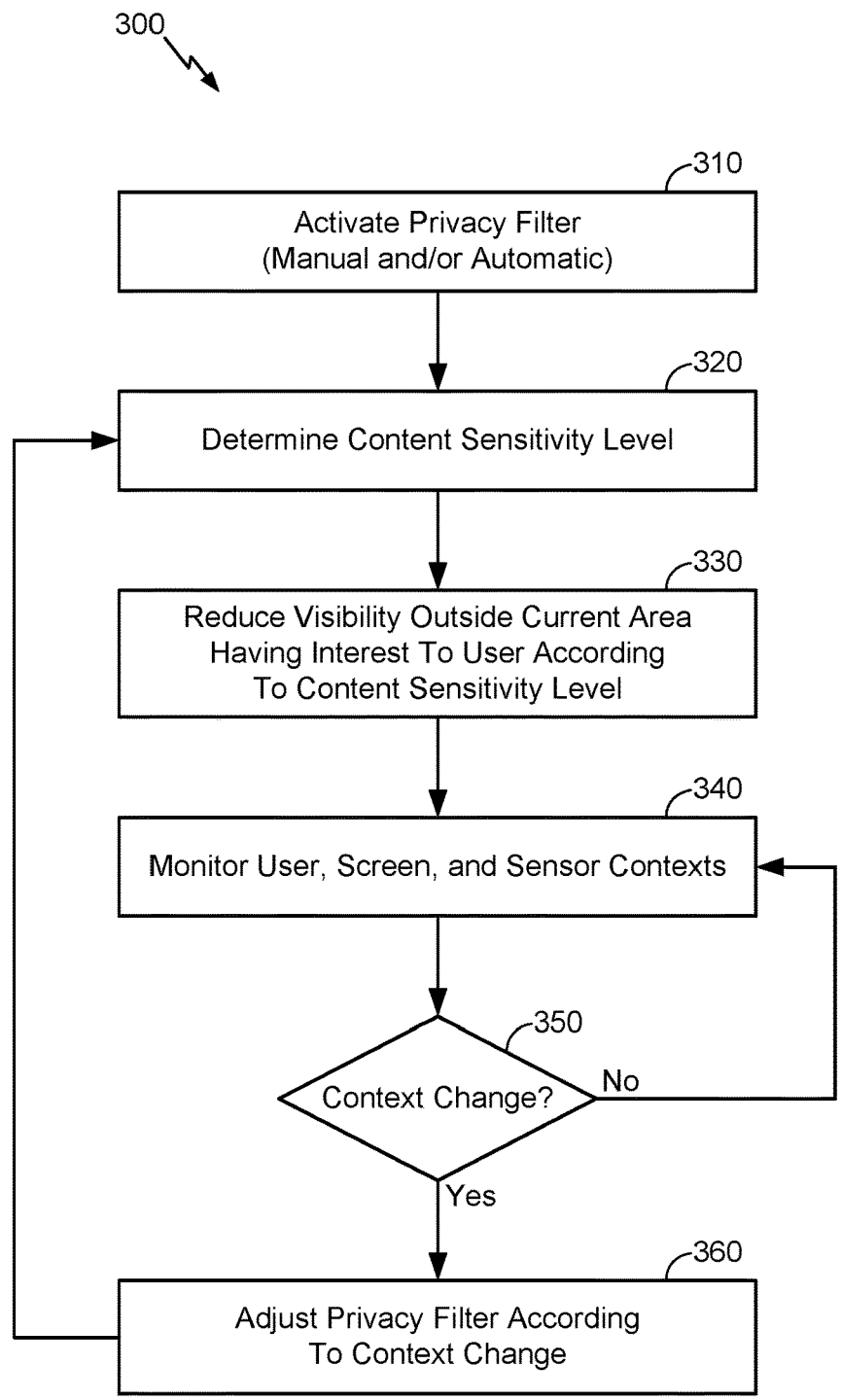
FIG. 3 illustrates an exemplary method to operate the user-controllable screen privacy software based on changes in context, according to various aspects.

According to various aspects, FIG. 3 illustrates an exemplary method 300 to operate user-controllable screen privacy software as described herein based on changes in context. For example, in various embodiments, the method 300 shown in FIG. 3 generally assumes that the privacy filter has been activated at block 310, wherein the user may manually activate the privacy filter, configure the privacy filter to automatically activate, and/or any suitable combination thereof (e.g., where the privacy software detects a sensitive context and requests user approval prior to activation). The sensitivity level associated with content displayed outside the current area having interest to the user may then be determined at block 320 such that visibility outside the current area having interest to the user may be reduced at block 330 according to the content sensitivity level. In various embodiments, at block 340, the user-controllable screen privacy software may then continue to monitor the user, screen, and sensor contexts to detect a potential change in context. For example, a context change may occur in response to detecting a face in a camera view that was not already in the camera view when the privacy filter was activated, in response to detecting a voice from a user that has not already been authenticated and thereby authorized to view the screen, etc. In another example, a context change may occur in response to the user providing one or more inputs (e.g., a touch or touchless gesture, a voice input, etc.) indicating that the current area having interest to the user has changed from one area in the screen to another, changing the shape associated with the current area of interest, etc. Alternatively, such context changes can be detected based on gaze tracking using camera inputs to track eye movements that indicate the area on the screen that the user is currently viewing. In still another example, a location-based sensor input may indicate that the user has moved from a private area to a public area (or vice versa) such that the privacy context and/or sensitivity level may have changed.

Accordingly, at block 350, the user-controllable screen privacy software may determine whether a context change has occurred, wherein the context change may be inferred based on sensor-based inputs and/or manually indicated through user input. In response to determining that a context change has not occurred, the user-controllable screen privacy software may continue to monitor the user, screen, and sensor contexts at block 340 until a context change has occurred. Otherwise, in the event that a context change has occurred, the privacy filter may be adjusted accordingly at block 360. For example, the privacy filter may be adjusted to change the current area having interest to the user such that the polarized, dimmed, blurred, or otherwise obscured area(s) are changed to those areas outside the new area having the current interest to the user. In another example, the context change may result in a change to the privacy filtering technique applied to the areas outside the current area having interest to the user (e.g., based on an increase or a decrease in the sensitivity level). In still another example, in the event that there are multiple authorized users and one or more unauthorized users that are located in different identifiable locations, the privacy filter may be tuned such that the authorized users can view the screen and the privacy filter only blocks the unauthorized users from having the ability to view the protected information. In yet another example, the context change may simply comprise deactivating the privacy filter and displaying all information normally without any protection against snooping.

Figure 4:
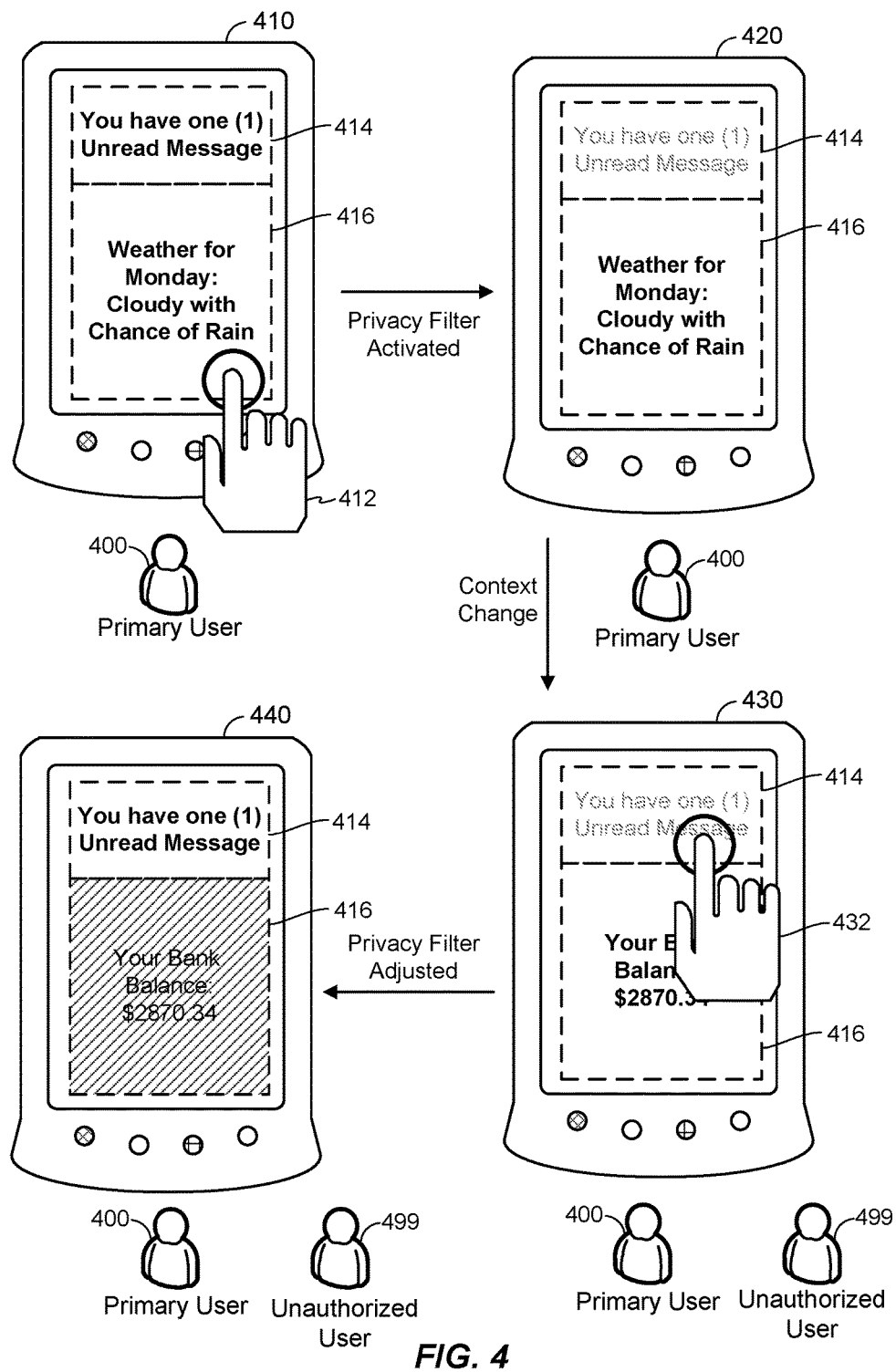
FIG. 4 to FIG. 6 illustrate exemplary contexts in which the user-controllable screen privacy software described herein may operate, according to various aspects.

According to various aspects, FIG. 4 illustrates exemplary contexts in which the user-controllable screen privacy software described herein may operate. For example, as shown at 410, a user device running the user-controllable screen privacy software may display information relating to email in a first area 414 and weather information in a second area 416. Accordingly, as depicted at 412, the privacy filter may be activated in response to a manual input from a user 400 indicating the second area 416 as the current area having interest to the user 400. As such, in the context shown at 420, the information in the second area 416 is displayed normally while the privacy filter has been activated to dim the email information displayed in the first area 414 outside the second area 416 having the current interest to the user 400. Furthermore, as depicted at 432, a context change may occur in response to the user 400 changing the current area having interest to the user 400 to be the first area 414 rather than the second area 416, which has been changed from displaying weather information to instead display financial information. Furthermore, in the context shown at 430, an unauthorized user 499 has been detected (e.g., based on sensor-based input from a camera, a microphone, etc.). Accordingly, in the context shown at 440, the email information in the first area 414 has been made visible based on the user 400 changing the current area of interest to the first area 414 and the privacy filter has been adjusted to reduce visibility associated with the financial information in the second area 416. Furthermore, the privacy filter has been adjusted in the context shown at 440 to further obscure the financial information displayed therein based on the unauthorized user 499 presence and/or the potential sensitivity associated with the financial information displayed therein. Furthermore, those skilled in the art will appreciate that although the user inputs 412, 432 as shown in FIG. 4 appear to be touchscreen inputs, the user inputs could also comprise touchless gestures and/or other suitable inputs, or the context changes could be detected based on gaze tracking or other sensor-based inputs. As such, those skilled in the art will appreciate that the particular configuration shown in FIG. 4 is for illustration purposes only and that any suitable mechanism(s) to activate and/or tune the privacy filter as described herein can be used.

Figure 5:
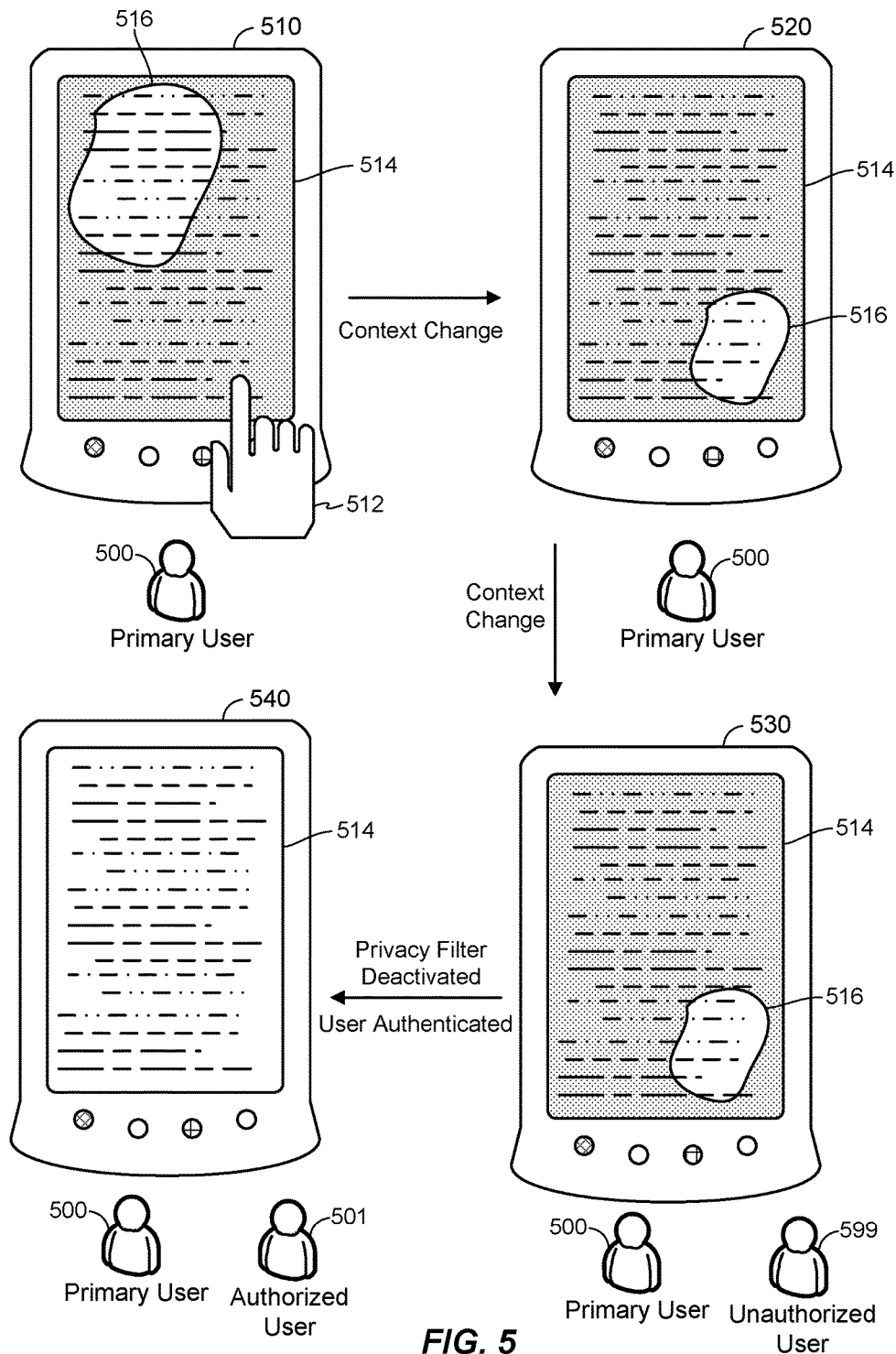

According to various aspects, FIG. 5 illustrates another exemplary context in which the user-controllable screen privacy software described herein may operate. For example, as shown at 510, the user device may be displaying a document 514 and the privacy filter may be activated in response to an input 512 from a primary user 500 that designates a current area 516 having interest to the primary user 500 according to a particular shape (e.g., drawn using a touchscreen, stylus, etc.). As shown at 520, a context change may occur as the primary user 500 changes focus within the document 514, wherein the current area 516 having interest to the primary user 500 may be repositioned to another location in the document 514 and/or changed with respect to the shape used to designate the current area of interest 516. As shown at 530, another context change may occur in response to detecting an unauthorized user 599 (e.g., based on sensor-based input from a camera, a microphone, etc.). However, whereas the example context(s) shown in FIG. 4 increased the level at which the displayed information was obscured based on unauthorized user presence, the context shown at 540 assumes that the unauthorized user 599 has been authenticated (e.g., based on a voiceprint identification, a fingerprint identification received via a biometric sensor, based on the primary user 500 authenticating the unauthorized user 599, etc.). As such, assuming that the unauthorized user 599 has been authenticated through any suitable technique, the unauthorized user 599 may become an additional authorized user 501, as shown in the context depicted at 540. Furthermore, in the context depicted at 540, the privacy may be deactivated and the document 514 may be displayed normally, thereby permitting both the primary user 500 and the additional authorized user 501 to view the document 514 displayed on the screen.

Figure 6:
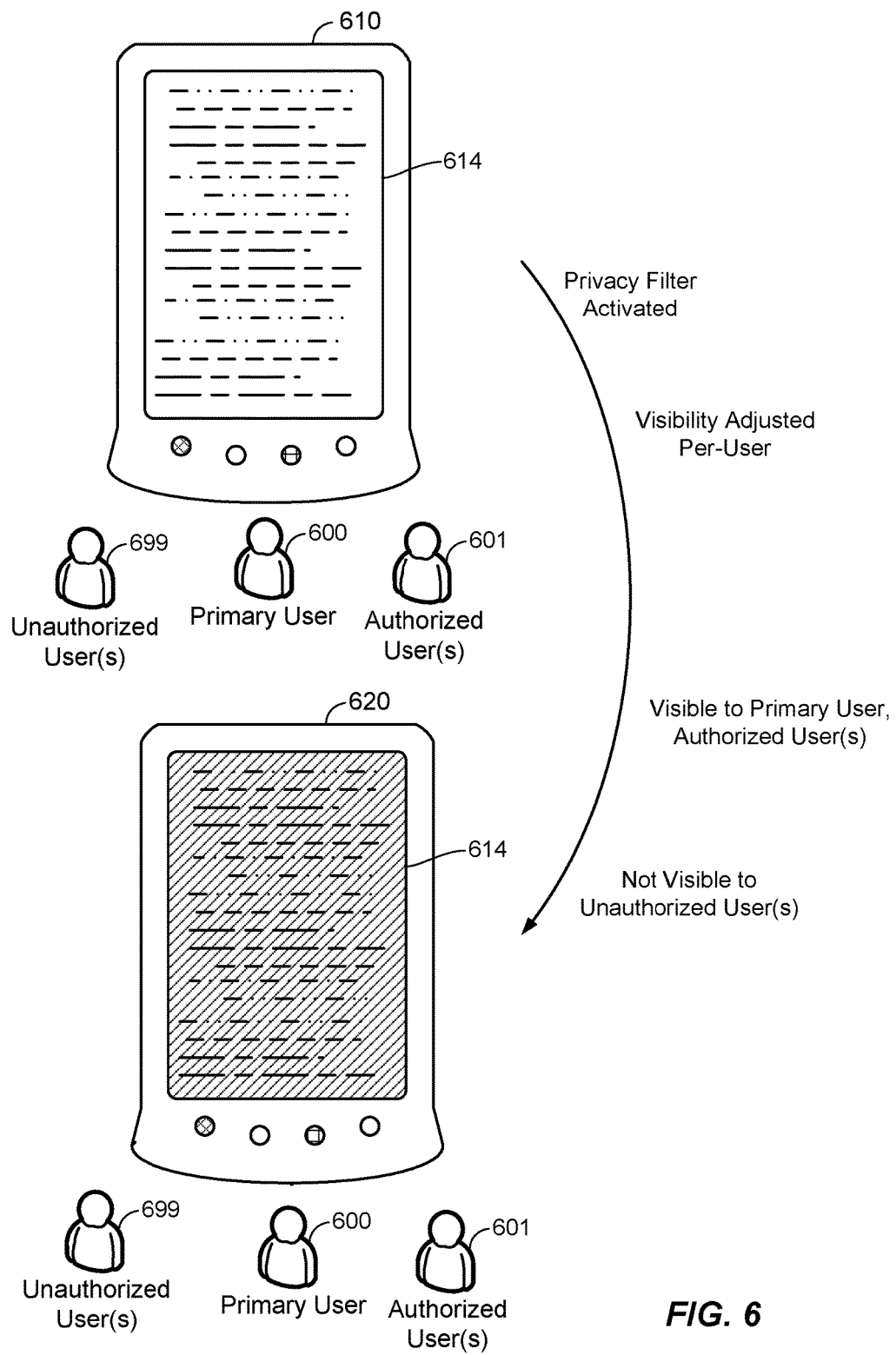

According to various aspects, FIG. 6 illustrates yet another exemplary context in which the user-controllable screen privacy software described herein may operate. For example, as shown at 610, the user device may be displaying a document 614 to a primary user 600 and one or more additional authorized users 601 in a similar manner to the context 540 as depicted in FIG. 5. However, as shown at 610, one or more unauthorized users 699 have been detected. Accordingly, to ensure that the primary user 600 and the additional authorized user(s) 601 can view the document 614 while protecting against the unauthorized user(s) 699 viewing the document, a privacy filter can be adjusted to ensure that the authorized user(s) 601 shown as positioned to the right of the user device can view the document 614 while altering the display such that the unauthorized user(s) 699 cannot view the document 614, as depicted at 620. As such, assuming that the authorized user(s) 601 and the unauthorized user(s) 699 are in discrete locations relative to the screen, the privacy filter may be adjusted to ensure that the current area of interest is visible to the primary user 600 and/or any additional authorized user(s) 601 while not being visible to any unauthorized user(s) 699.

Figure 7:
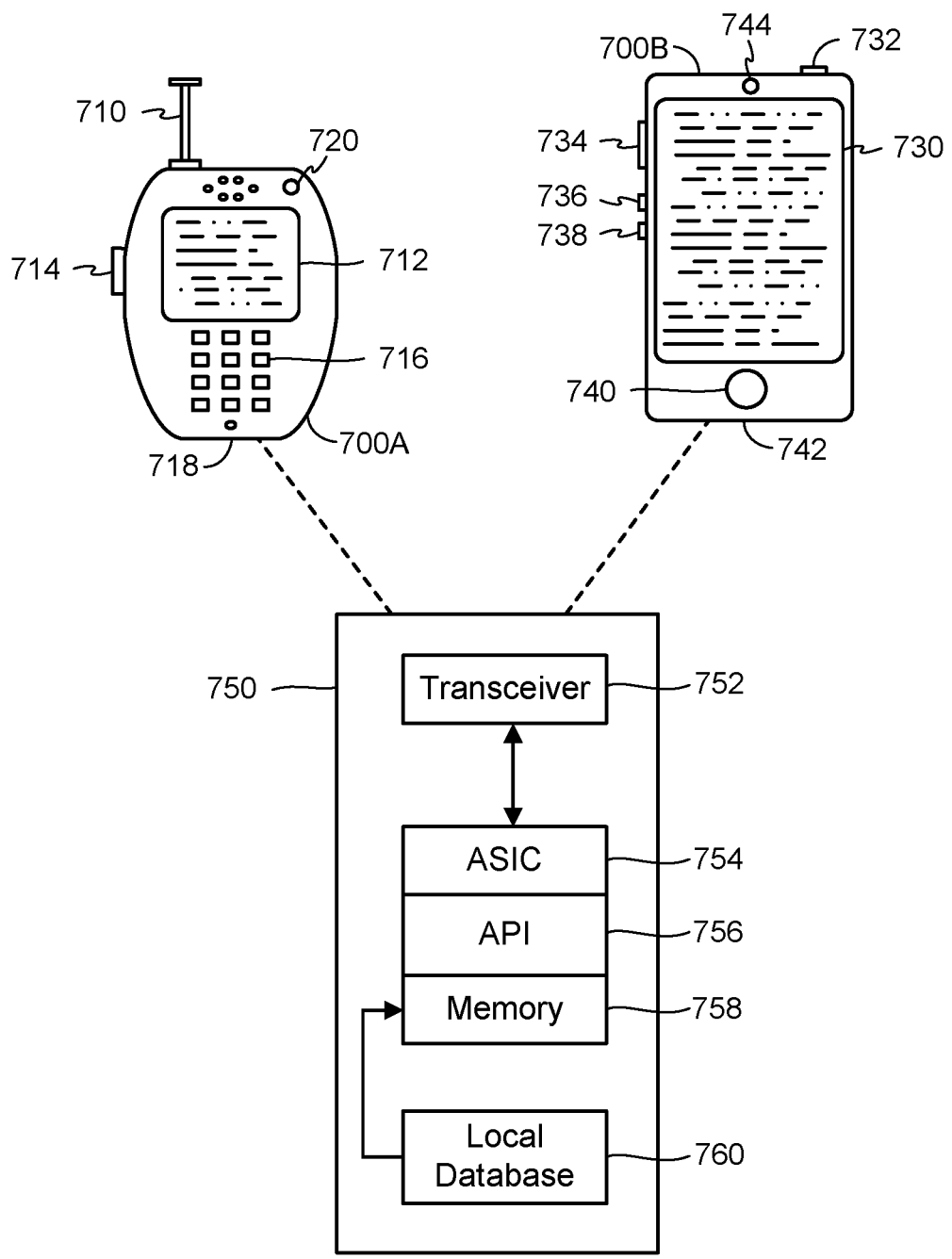
FIG. 7 illustrates exemplary wireless devices that may include the user-controllable screen privacy software described herein, according to various aspects.

According to various aspects, FIG. 7 illustrates exemplary wireless devices 700A, 700B that may include user-controllable screen privacy software as described herein. For example, in the example embodiments illustrated in FIG. 7, the wireless device 700A is illustrated as a telephone and the wireless device 700B is illustrated as a touchscreen device (e.g., a smart phone, a tablet computer, etc.). As shown in FIG. 7, an external casing of the wireless device 700A is configured with an antenna 710, a display 712, at least one button 714 (e.g., a power button, a volume control button, etc.), a keypad 716, a microphone 718, and a screen-facing camera 720. Furthermore, the wireless device 700B shown in FIG. 7 includes an external casing configured with a touchscreen display 730, peripheral buttons 732, 734, 736 and 738 (e.g., a power control button, a volume or vibrate control button, an airplane mode toggle button, etc.), at least one front-panel button 740 (e.g., a Home button, etc.), a microphone 742, and a screen-facing camera 744. In various embodiments, the button 714 and/or other peripheral buttons 732, 734, 736 and 738 may be used to open direct communication to a target device. However, those skilled in the art will appreciate that other devices and methods can be alternately used to engage in communication, such as a "soft key" on touch screen display 730, other methods as known in the art. Furthermore, those skilled in the art will appreciate that the wireless device 700A may include various other components that may not be separately illustrated in FIG. 7 or described herein (e.g., a rear-facing camera, speakers, etc.).

In various embodiments, while not shown explicitly in FIG. 7, the wireless device 700B can include one or more external antennas and/or one or more integrated antennas that are built into the external casing of the wireless device 700B, including but not limited to Wi-Fi antennas, cellular antennas, satellite position system (SPS) antennas (e.g., global positioning system (GPS) antennas), and so on, and the wireless device 700A may likewise include one or more external and/or integrated antennas in addition to the antenna 710. In any case, the one or more external and/or integrated antennas (including at least the antenna 710) can be used to open a direct communication channel with the wireless devices 700A and/or 700B and thereby provide a direct communication interface to the wireless devices 700A and/or 700B, wherein the direct communication interface may typically comprise hardware known to those skilled in the art. Furthermore, in various embodiments, the direct communication interface can integrate with standard communication interfaces associated with the wireless devices 700A and/or 700B that are ordinarily used to carry voice and data transmitted to and from the wireless devices 700A and/or 700B.

Furthermore, although internal components of the wireless device 700A and the wireless device 700B can be embodied with different hardware configurations, FIG. 7 shows one exemplary platform 750 that may provide a basic high-level configuration for internal hardware components associated with the wireless devices 700A and/or 700B. In particular, the platform 750 can generally receive and execute software applications, data, and/or commands transmitted from a cellular network that may ultimately come from a core network, the Internet, and/or other remote servers and networks (e.g., an application server, web URLs, etc.). The platform 750 can also independently execute locally stored applications without cellular network interaction. The platform 750 can include a transceiver 752 coupled to an application specific integrated circuit (ASIC) 754, or other processor, microprocessor, logic circuit, or other data processing device. The ASIC 754 or other processor executes an application programming interface (API) 756 layer that interfaces with any application environment resident in a memory 758, which can include the operating system loaded on the ASIC 754 and/or any other resident programs in the memory 758 (e.g., the "binary runtime environment for wireless" (BREW) wireless device software platform developed by QUALCOMM®). The memory 758 can be comprised of read-only memory (ROM) or random-access memory (RAM), electrically erasable programmable ROM (EEPROM), flash cards, or any memory common to computer platforms. The platform 750 also can include a local database 760 that can store applications not actively used in memory 758, as well as other data. The local database 760 is typically a flash memory cell, but can be any secondary storage device as known in the art, such as magnetic media, EEPROM, optical media, tape, soft or hard disk, or the like.

According to various aspects, the user-controllable screen privacy software and the various functional features associated therewith can be performed on the wireless devices 700A, 700B shown in FIG. 7 and/or other suitable devices with similar external and/or internal components. For example, as will be apparent to those skilled in the art, the various functional features described herein can be embodied in discrete elements, software modules executed on a processor, and/or any combination of software and hardware to achieve the functionality described herein. For example, the ASIC 754, the memory 758, the API 756, and the local database 760 may all be used cooperatively to load, store and execute the user-controllable screen privacy software described herein and perform the various associated functions described herein, whereby the logic to perform such functions may be distributed over various elements. Alternatively, the functionality could be incorporated into one discrete component. Furthermore, certain wireless devices that may be used in the various embodiments disclosed herein may not include certain components and/or functionalities associated with the wireless devices 700A and 700B shown in FIG. 7. Therefore, those skilled in the art will appreciate that the features associated with the wireless devices 700A and 700B shown in FIG. 7 are merely illustrative and the disclosure is not limited to the illustrated features or arrangements.

According to various aspects, wireless communication the wireless devices 700A, 700B can be based on different technologies, including, without limitation, CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the wireless devices 700A and/or 700B from and using various networks and network configurations. Accordingly, the illustrations provided herein are not intended to limit the aspects of the disclosure and are merely to aid in the description of various aspects disclosed herein.

As such, various aspects described herein contemplate that the wireless devices 700A, 700B shown in FIG. 7 and/or other suitable devices with similar external and/or internal components have the ability to perform the functions associated with the user-controllable screen privacy software described herein. For example, in various embodiments, the user-controllable screen software may be stored in the memory 214 and executed on the ASIC 208 and/or another suitable processor such that the user-controllable screen software may have access to the displays 712, 730, the screen-facing cameras 720, 742, the microphones 718, 742, and/or any other suitable component(s) that may be used to determine and track user, screen, and/or sensor contexts. Accordingly, in various embodiments, the user-controllable screen privacy software may activate and/or adjust a privacy filter to reduce visibility associated with information shown on the displays 712, 730 outside a current area having interest to a user, which may be tracked, inferred, and/or otherwise determined based on various user and/or sensor inputs as described in further detail above.

Figure 8:
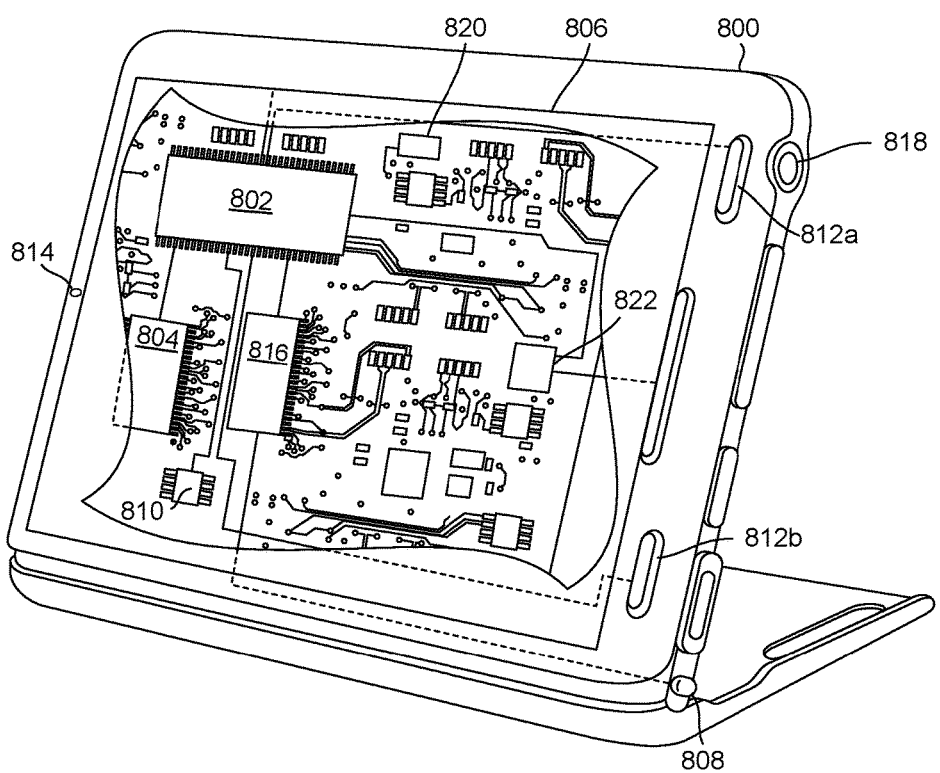
FIG. 8 illustrates an exemplary wireless device that may include the user-controllable screen privacy software described herein, according to various aspects.

According to various aspects, FIG. 8 illustrates another exemplary wireless device 800 that may include user-controllable screen privacy software as described herein. For example, in various embodiments, the wireless device 800 shown in FIG. 8 may correspond to the user device 110 shown in FIG. 1. Furthermore, although the wireless device 800 is shown in FIG. 8 as having a tablet configuration, those skilled in the art will appreciate that the wireless device 800 may take other suitable forms (e.g., a smartphone). As shown in FIG. 8, the wireless device 800 may include a processor 802 coupled to internal memories 804 and 816, which may be volatile or non-volatile memories, and may also be secure and/or encrypted memories, unsecure and/or unencrypted memories, and/or any suitable combination thereof. In various embodiments, the processor 802 may also be coupled to a display 806, such as a resistive-sensing touch screen display, a capacitive-sensing infrared sensing touch screen display, or the like. However, those skilled in the art will appreciate that the display 806 need not have touch screen capabilities, as the user-controllable screen privacy software as described herein contemplates user inputs that comprise touchless gestures, microphone inputs, etc. Additionally, the wireless device 800 may have one or more antenna 808 that can be used to send and receive electromagnetic radiation that may be connected to a wireless data link and/or a cellular telephone transceiver 816 coupled to the processor 802. The wireless device 800 may also include physical buttons 812a and 812b to receive user inputs and a power button 818 to turn the wireless device 800 on and off. The wireless device 800 may also include a microphone, a screen-facing camera 814, a battery 820 coupled to the processor 802, and a position sensor 822 (e.g., a GPS receiver) coupled to the processor 802.

As such, various aspects described herein contemplate that the wireless device 800 shown in FIG. 8 and/or other suitable devices with similar external and/or internal components have the ability to perform the functions associated with the user-controllable screen privacy software described herein. For example, in various embodiments, the user-controllable screen software may be stored in the internal memories 804, 816 and executed on the processor 802 such that the user-controllable screen software may have access to the display 806, the screen-facing camera 814, the microphone, the position sensor 822, and/or any other suitable component(s) that may be used to determine and track user, screen, and/or sensor contexts. Accordingly, in various embodiments, the user-controllable screen privacy software may activate and/or adjust a privacy filter to reduce visibility associated with information shown on the display 806 outside a current area having interest to a user, which may be tracked, inferred, and/or otherwise determined based on various user and/or sensor inputs as described in further detail above.

Figure 9:
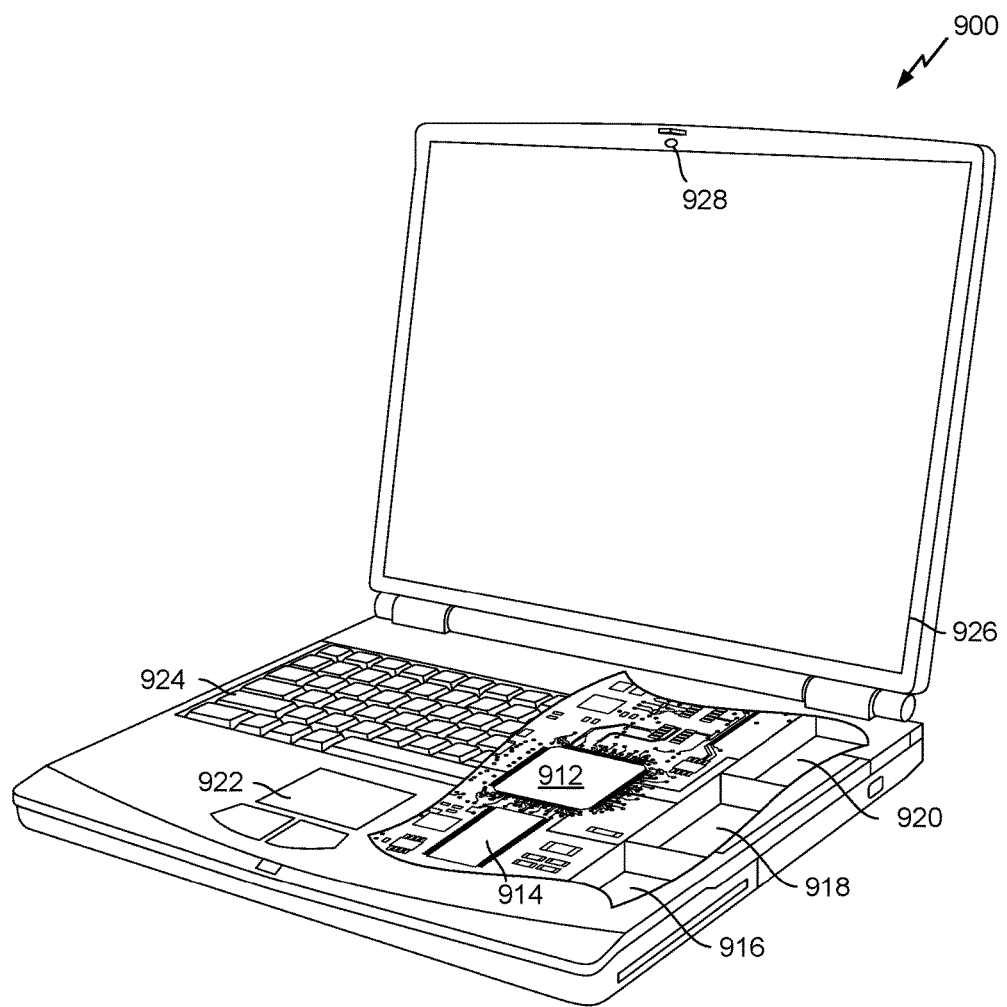
FIG. 9 illustrates an exemplary computing device that may include the user-controllable screen privacy software described herein, according to various aspects.

According to various aspects, FIG. 9 illustrates an exemplary personal computing device 900 that may include user-controllable screen privacy software as described herein, whereby the personal computing device 900 shown in FIG. 9 may also correspond to the user device 110 shown in FIG. 1. Furthermore, although the personal computing device 900 is shown in FIG. 9 as a laptop computer, those skilled in the art will appreciate that the personal computing device 900 may take other suitable forms (e.g., a desktop computer). According to various embodiments, the personal computing device 900 shown in FIG. 9 may comprise a touchpad 922 having a surface that may serve as a pointing device, which may therefore receive drag, scroll, and flick gestures similar to those implemented on mobile computing devices typically equipped with a touch screen display as described above. The personal computing device 900 may further include a processor 912 coupled to a volatile memory 914 and a large capacity nonvolatile memory, such as a disk drive 916 of Flash memory. The personal computing device 900 may also include a floppy disc drive 918 and a compact disc (CD) drive 920 coupled to the processor 912. The personal computing device 900 may also include various connector ports coupled to the processor 912 to establish data connections or receive external memory devices, such as USB connector sockets, FireWire® connector sockets, and/or any other suitable network connection circuits that can couple the processor 912 to a network. In a notebook configuration, the personal computing device 900 may have a housing that includes the touchpad 922, a keyboard 924, a display 926, and a screen-facing camera 928 coupled to the processor 912. Furthermore, although not separately illustrated in FIG. 9, the personal computing device 900 may also include a microphone, a battery, and a position sensor (e.g., a GPS receiver) coupled to the processor 912. Additionally, the personal computing device 900 may have one or more antenna that can be used to send and receive electromagnetic radiation that may be connected to a wireless data link and/or a cellular telephone transceiver coupled to the processor 912. Other configurations of the personal computing device 900 may include a computer mouse or trackball coupled to the processor 912 (e.g., via a USB input) as are well known, which may also be used in conjunction with the various aspects and embodiments described herein.

As such, various aspects described herein contemplate that the personal computing device 900 shown in FIG. 9 and/or other suitable devices with similar external and/or internal components have the ability to perform the functions associated with the user-controllable screen privacy software described herein. For example, in various embodiments, the user-controllable screen software may be executed on the processor 912 such that the user-controllable screen software may have access to the display 926, the touchpad 922, the keyboard 924, the screen-facing camera 928, the microphone, the position sensor, and/or any other suitable component(s) that may be used to determine and track user, screen, and/or sensor contexts as described herein. Accordingly, in various embodiments, the user-controllable screen privacy software may activate and/or adjust a privacy filter to reduce visibility associated with information shown on the display 926 outside a current area having interest to a user, which may be tracked, inferred, and/or otherwise determined based on various user and/or sensor inputs as described in further detail above.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the non-transitory computer-readable medium may be discrete components in a user terminal.

In one or more exemplary aspects, the functions described may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method for providing user-controllable screen privacy, comprising:
   monitoring, via software executing on a user device, a current context associated with information displayed on a screen of the user device;
   determining, via the software executing on the user device, an area displayed on the screen having current interest to one or more authorized users based at least in part on the monitored current context indicating that the one or more authorized users are interacting with information positioned within the determined area; and
   activating, via the software executing on the user device, a software-based privacy filter configured to reduce visibility associated with information displayed on the screen outside the area having the current interest to the one or more authorized users.

2. The method recited in claim 1, further comprising receiving a user input that indicates the area having the current interest to the one or more authorized users, wherein the user input that indicates the area having the current interest to the one or more authorized users comprises one or more of a touch gesture or a touchless gesture.

3. The method recited in claim 1, further comprising receiving information from one or more sensors on the user device that indicates the area having the current interest to the one or more authorized users.

4. The method recited in claim 3, wherein the information received from the one or more sensors comprises one or more of biometric data, a current gaze detected using a camera positioned on a same side of the user device as the screen, a voice input received at a microphone on the user device, or location data detected using one or more location sensors on the user device.

5. The method recited in claim 1, further comprising determining a sensitivity level associated with the software-based privacy filter according to information received from one or more sensors on the user device.

6. The method recited in claim 1, further comprising determining a potential need to activate the software-based privacy filter according to information received from one or more sensors on the user device.

7. The method recited in claim 1, further comprising:
detecting, at the user device, a change in the area displayed on the screen having the current interest to the one or more authorized users; and
adjusting the software-based privacy filter to reduce visibility associated with information displayed on the screen outside the changed area having the current interest to the one or more authorized users.

8. The method recited in claim 1, further comprising:
using one or more sensor-based inputs received from one or more sensors on the user device to determine the one or more authorized users among one or more people located in sufficient proximity to view the screen;
tracking the one or more authorized users using the one or more sensor-based inputs to detect a change in the area displayed on the screen having the current interest to the one or more authorized users; and
adjusting the software-based privacy filter to reduce visibility associated with information displayed on the screen outside the changed area having the current interest to the one or more authorized users.

9. The method recited in claim 1, further comprising:
using one or more sensor-based inputs received from one or more sensors on the user device to determine one or more unauthorized users that are located in sufficient proximity to view the screen; and
adjusting the software-based privacy filter such that information displayed on the screen within the area having the current interest to the one or more authorized users is visible to the one or more authorized users and not visible to the one or more unauthorized users.

10. An apparatus, comprising:
a screen configured to display information; and
one or more processors configured to execute software configured to cause the one or more processors to:
monitor a current context associated with the information displayed on the screen;
determine an area displayed on the screen having current interest to one or more authorized users based at least in part on the monitored current context indicating that the one or more authorized users are interacting with information positioned within the determined area; and
activate a software-based privacy filter configured to reduce visibility associated with information displayed on the screen outside the area having the current interest to the one or more authorized users.

11. The apparatus recited in claim 10, further comprising:
one or more input devices configured to receive a user input indicating the area having the current interest to the one or more authorized users according to one or more of a touch gesture or a touchless gesture.

12. The apparatus recited in claim 10, further comprising:
one or more sensors configured to provide, to the software, one or more sensor-based inputs indicating the area having the current interest to the one or more authorized users.

13. The apparatus recited in claim 12, wherein the one or more sensors comprise one or more of a biometric sensor, a camera positioned on a same side of the apparatus as the screen and configured to detect a current gaze associated with the one or more authorized users, a microphone configured to receive voice input, or one or more location sensors configured to detect location data.

14. The apparatus recited in claim 10, further comprising:
one or more sensors, the executed software further configured to cause the one or more processors to determine a sensitivity level associated with the software-based privacy filter according to information received from the one or more sensors.

15. The apparatus recited in claim 10, further comprising:
one or more sensors, wherein the one or more processors are further configured to determine a potential need to activate the software-based privacy filter according to information received from the one or more sensors.

16. The apparatus recited in claim 10, the executed software further configured to cause the one or more processors to:
detect a change in the area displayed on the screen having the current interest to the one or more authorized users; and
adjust the software-based privacy filter to reduce visibility associated with information displayed on the screen outside the changed area having the current interest to the one or more authorized users.

17. The apparatus recited in claim 10, further comprising:
one or more sensors configured to generate one or more sensor-based inputs indicating one or more people located in sufficient proximity to view the screen, the executed software further configured to cause the one or more processors to:
use the one or more sensor-based inputs to determine the one or more authorized users among the one or more people located in sufficient proximity to view the screen;
track the one or more authorized users using the one or more sensor-based inputs to detect a change in the area displayed on the screen having the current interest to the one or more authorized users; and
adjust the software-based privacy filter to reduce visibility associated with information displayed on the screen outside the changed area having the current interest to the one or more authorized users.

18. The apparatus recited in claim 10, further comprising:
one or more sensors configured to generate one or more sensor-based inputs indicating one or more people located in sufficient proximity to view the screen, the executed software further configured to cause the one or more processors to:
use the one or more sensor-based inputs to determine one or more unauthorized users among the one or more people located in sufficient proximity to view the screen; and
adjust the software-based privacy filter such that information displayed on the screen within the area having the current interest to the one or more authorized users is visible to the one or more authorized users and not visible to the one or more unauthorized users.

19. An apparatus, comprising:
means for displaying information;
means for monitoring a current context associated with the displayed information;
means for activating a software-based privacy filter configured to reduce visibility associated with the information displayed outside an area having current interest to one or more authorized users, wherein the area having the current interest to the one or more authorized users is determined based at least in part on the monitored current context indicating that the one or more authorized users are interacting with information positioned within the determined area.

20. The apparatus recited in claim 19, further comprising means for receiving a user input that indicates the area having the current interest to the one or more authorized users according to one or more of a touch gesture or a touchless gesture.

21. The apparatus recited in claim 19, further comprising means for sensing the area having the current interest to the one or more authorized users.

22. The apparatus recited in claim 19, further comprising means for sensing information that indicates one or more of a potential need to activate the software-based privacy filter or a sensitivity level associated with the software-based privacy filter.

23. The apparatus recited in claim 19, further comprising:
means for detecting a change in the area having the current interest to the one or more authorized users; and
means for adjusting the software-based privacy filter to reduce visibility associated with information displayed outside the changed area having the current interest to the one or more authorized users.

24. The apparatus recited in claim 19, further comprising:
means for detecting one or more unauthorized users that are located in sufficient proximity to view the displayed information located within the area having the current interest to the one or more authorized users; and
means for adjusting the software-based privacy filter such that the displayed information located within the area having the current interest to the one or more authorized users is visible to the one or more authorized users and not visible to the one or more unauthorized users.

25. A non-transitory computer-readable storage medium storing computer-executable instructions, the computer-executable instructions configured to cause one or more processors to:
monitor a current context associated with information displayed on a screen;
determine an area displayed on the screen having current interest to one or more authorized users based at least in part on the monitored current context indicating that the one or more authorized users are interacting with information positioned within the determined area; and
activate a software-based privacy filter configured to reduce visibility associated with information displayed on the screen outside the area having the current interest to the one or more authorized users.

26. The non-transitory computer-readable storage medium recited in claim 25, the stored computer-executable instructions further configured to cause the one or more processors to receive a user input that indicates the area having the current interest to the one or more authorized users according to one or more of a touch gesture or a touchless gesture.

27. The non-transitory computer-readable storage medium recited in claim 25, the stored computer-executable instructions further configured to cause the one or more processors to receive information that indicates the area having the current interest to the one or more authorized users from one or more sensors.

28. The non-transitory computer-readable storage medium recited in claim 25, the stored computer-executable instructions further configured to cause the one or more processors to determine one or more of a potential need to activate the software-based privacy filter or a sensitivity level associated with the software-based privacy filter according to information received from one or more sensors.

29. The non-transitory computer-readable storage medium recited in claim 25, the stored computer-executable instructions further configured to cause the one or more processors to:
detect a change in the area displayed on the screen having the current interest to the one or more authorized users; and
adjust the software-based privacy filter to reduce visibility associated with information displayed on the screen outside the changed area having the current interest to the one or more authorized users.

30. The non-transitory computer-readable storage medium recited in claim 25, the stored computer-executable instructions further configured to cause the one or more processors to:
use one or more sensor-based inputs received from one or more sensors to determine one or more unauthorized users that are located in sufficient proximity to view the screen; and
adjust the software-based privacy filter such that information displayed on the screen within the area having the current interest to the one or more authorized users is visible to the one or more authorized users and not visible to the one or more unauthorized users.

* * * * *